(12) United States Patent
Wu

(10) Patent No.: US 8,502,777 B2
(45) Date of Patent: Aug. 6, 2013

(54) MOUSE DEVICE WITH MOVABLE BUTTON

(75) Inventor: Chun-Che Wu, Taipei (TW)

(73) Assignee: Primax Electronics Ltd., Neihu (TW)

( * ) Notice: Subject to any disclaimer, the term of this patent is extended or adjusted under 35 U.S.C. 154(b) by 483 days.

(21) Appl. No.: 12/824,918

(22) Filed: Jun. 28, 2010

(65) Prior Publication Data

US 2011/0298713 A1    Dec. 8, 2011

(30) Foreign Application Priority Data

Jun. 7, 2010  (TW) ............................. 99118353 A

(51) Int. Cl.
  *G06F 3/033*  (2006.01)
(52) U.S. Cl.
  USPC .......................................... 345/163

(58) Field of Classification Search
  None
  See application file for complete search history.

(56) References Cited

U.S. PATENT DOCUMENTS 6,940,487 B2 * 9/2005 Matsunaga .................. 345/156
  2002/0084986 A1 * 7/2002 Armstrong .................. 345/163

* cited by examiner

*Primary Examiner* — Joseph Haley
(74) *Attorney, Agent, or Firm* — Tracy M. Heims; Apex Juris, pllc

(57) ABSTRACT

A mouse device with a movable button is provided. The mouse device includes a mouse body for supporting a user's palm, a first casing, and a first button covering the first casing. The first casing is connected with a body front end of the mouse body, and movable with respect to the mouse body along the body front end. As such, the position of the first button with respect to the mouse body is adjustable. According to the size of the user's palm, the position of the button is determined.

14 Claims, 9 Drawing Sheets

MOUSE DEVICE WITH MOVABLE BUTTON

FIELD OF THE INVENTION

The present invention relates to a mouse device, and more particularly to a mouse device with a movable button.

BACKGROUND OF THE INVENTION

As known, the common computer input device includes for example a mouse device, a keyboard, a trackball, a touchpad, and the like. Among these input devices, the mouse device is the most prevailing because it complies with the usual practices of most users. When a mouse device is held by a user's palm, the user may move the mouse device to control movement of the cursor shown on the computer screen.

FIG. 1 is a schematic diagram illustrating the connection between a conventional mouse device and a computer system. The computer system 2 comprises a computer host 21 and a computer monitor 22. The computer host 21 is in communication with a wheel mouse device 1 and the computer monitor 22. A cursor 221 is displayed on the computer monitor 22. The wheel mouse device 1 is used for controlling the cursor 221 to have the computer host 21 execute a corresponding instruction. The wheel mouse device 1 comprises a mouse body 10, a left button 11 and a right button 12. The mouse body 10 is used for supporting a user's palm. When the mouse body 10 is moved by the user to result in a displacement amount, the computer host 21 correspondingly moves the cursor 221 shown on the computer monitor 22 according to the displacement amount. By clicking the left button 11 or the right button 12, a control signal is issued to the computer host 21. In response to the control signal, the computer host 21 executes a corresponding instruction. The basic functions of the wheel mouse device have been described above.

Generally, for different users, the size of the palms and the length of the fingers are different. Since the mouse body of the common mouse device has a fixed size, the mouse device may only comply with the palms and fingers of specified users. In other words, the size of the mouse body of such a mouse device fails to comply with the palms and fingers of some other users. If the unsuitable mouse device is used for a long time period, the procedure of operating the mouse device usually incurs unacceptable fatigue of the user's hand.

Therefore, there is a need of providing a mouse device for complying with various-sized palms.

SUMMARY OF THE INVENTION

It is an object of the present invention to provide a mouse device with a movable button in order to comply with various-sized palms.

In accordance with an aspect of the present invention, there is provided a mouse device with a movable button. The mouse device is in communication with a computer host. The mouse device includes a mouse body, a first casing, a first button, a first circuit board and a first switch. The mouse body includes a body base and a body upper cover. The body base is covered by the body upper cover. The body upper cover has a body front end and a body rear end. The first casing is connected with the body front end of the mouse body, and movable with respect to the mouse body along the body front end. The first button is disposed on the first casing and covers the first casing. The first circuit board is disposed within the first casing. The first switch is mounted on the first circuit board to be triggered by the first button. The first casing is separated from the body rear end of the mouse body.

In an embodiment, the mouse body further includes a first fixing hole and a first sliding groove. In addition, the first casing includes a first rotating part and a first sliding part. The first rotating part is inserted within the mouse body through the body front end, and coupled with the first fixing hole. The first sliding part is arranged between the first button and the first rotating part, inserted within the mouse body through the body front end, and coupled with the first sliding groove. The first rotating part is rotatable with respect to the first fixing hole, so that the first casing is movable with respect to the mouse body.

In an embodiment, the first rotating part has a first protrusion inserted into the first fixing hole, so that the first casing and the mouse body are combined together. In addition, the first protrusion is rotatable with respect to the first fixing hole, so that the first casing is movable with respect to the mouse body.

In an embodiment, the first sliding groove further includes a first saw-toothed structure, and the first sliding part further includes a first salient. When the first casing is moved with respect to the mouse body, the first sliding part is moved in the first sliding groove, and the first salient is engaged with the first saw-toothed structure to fix the first casing.

In an embodiment, the first rotating part includes a first coupling hole and a first rotating shaft. A first end of the first rotating shaft is inserted into the first fixing hole. A second end of the first rotating shaft is inserted into the first coupling hole. The first end of the first rotating shaft and the first fixing hole are connected with each other to be synchronously rotated. The second end of the first rotating shaft and the first coupling hole are connected with each other to be synchronously rotated. The second end of the first rotating shaft is rotatable with respect the first end of the first rotating shaft, so that the first casing is movable with respect to the mouse body.

In an embodiment, the first sliding part includes a first slot, and the first sliding groove includes a first fixing post. When the first casing is moved with respect to the mouse body and the first sliding part is moved in the first sliding groove, the first fixing post is inserted into the first slot, so that the first sliding part is fixed in the first sliding groove.

In an embodiment, the mouse device further includes a second casing, a second button, a second circuit board and a second switch. The second casing is connected with the body front end of the mouse body, arranged beside the first casing, and movable with respect to the mouse body along the body front end. The second button is disposed on the second casing and covers the second casing. The second circuit board is disposed within the second casing. The second switch is mounted on the second circuit board to be triggered by the second button. The second casing is separated from the body rear end of the mouse body.

In an embodiment, the mouse body further includes a second fixing hole and a second sliding groove. In addition, the second casing includes a second rotating part and a second sliding part. The second rotating part is inserted within the mouse body through the body front end, and coupled with the second fixing hole. The second sliding part is arranged between the second button and the second rotating part, inserted within the mouse body through the body front end, and coupled with the second sliding groove. The second rotating part is rotatable with respect to the second fixing hole, so that the second casing is movable with respect to the mouse body.

In an embodiment, the second rotating part has a second protrusion inserted into the second fixing hole, so that the second casing and the mouse body are combined together. In addition, the second protrusion is rotatable with respect to the second fixing hole, so that the second casing is movable with respect to the mouse body.

In an embodiment, the second sliding groove further includes a second saw-toothed structure, and the second sliding part further includes a second salient. When the second casing is moved with respect to the mouse body, the second sliding part is moved in the second sliding groove, and the second salient is engaged with the second saw-toothed structure to fix the second casing.

In an embodiment, the second rotating part includes a second coupling hole and a second rotating shaft. A first end of the second rotating shaft is inserted into the second fixing hole. A second end of the second rotating shaft is inserted into the second coupling hole. The first end of the second rotating shaft and the second fixing hole are connected with each other to be synchronously rotated. The second end of the second rotating shaft and the second coupling hole are connected with each other to be synchronously rotated. The second end of the second rotating shaft is rotatable with respect the first end of the second rotating shaft, so that the second casing is movable with respect to the mouse body.

In an embodiment, the second sliding part includes a second slot, and the second sliding groove includes a second fixing post. When the second casing is moved with respect to the mouse body and the second sliding part is moved in the second sliding groove, the second fixing post is inserted into the second slot, so that the second sliding part is fixed in the second sliding groove.

In an embodiment, the mouse body further includes a mouse body circuit board and an optical displacement sensing module. The optical displacement sensing module is mounted on the mouse body circuit board for detecting a motion of the mouse body, thereby generating a cursor signal. The first casing further includes a first connecting wire. A first terminal of the first connecting wire is connected to the first circuit board. A second terminal of the first connecting wire is connected to the mouse body circuit board. The first switch generates a first triggering signal when the first button is pressed to trigger the first switch. The first triggering signal is transmitted to the mouse body circuit board through the first connecting wire. The second casing further includes a second connecting wire. A first terminal of the second connecting wire is connected to the second circuit board. A second terminal of the second connecting wire is connected to the mouse body circuit board. The second switch generates a second triggering signal when the second button is pressed to trigger the second switch. The second triggering signal is transmitted to the mouse body circuit board through the second connecting wire.

In an embodiment, the mouse body further includes a mouse body connecting wire, which is arranged between the first casing and the second casing. The mouse body connecting wire is connected to a computer host, so that the first triggering signal, the second triggering signal and the cursor signal are transmitted to the computer host through the mouse body connecting wire.

In an embodiment, the mouse body further includes a wireless signal transmitter for outputting the first triggering signal, the second triggering signal and the cursor signal. In addition, a wireless signal receiver is connected to the computer host for receiving the first triggering signal, the second triggering signal and the cursor signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
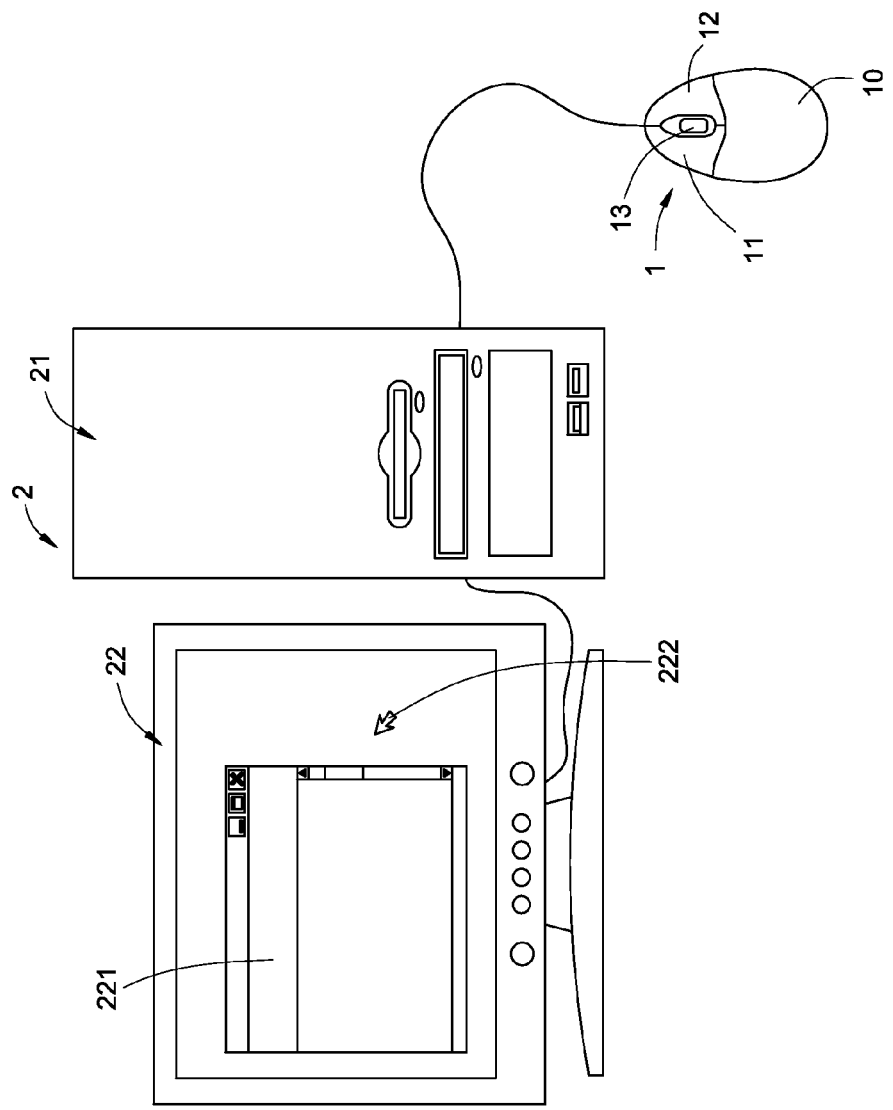
FIG. 1 is a schematic diagram illustrating the connection between a conventional mouse device and a computer system.
Figure 2:
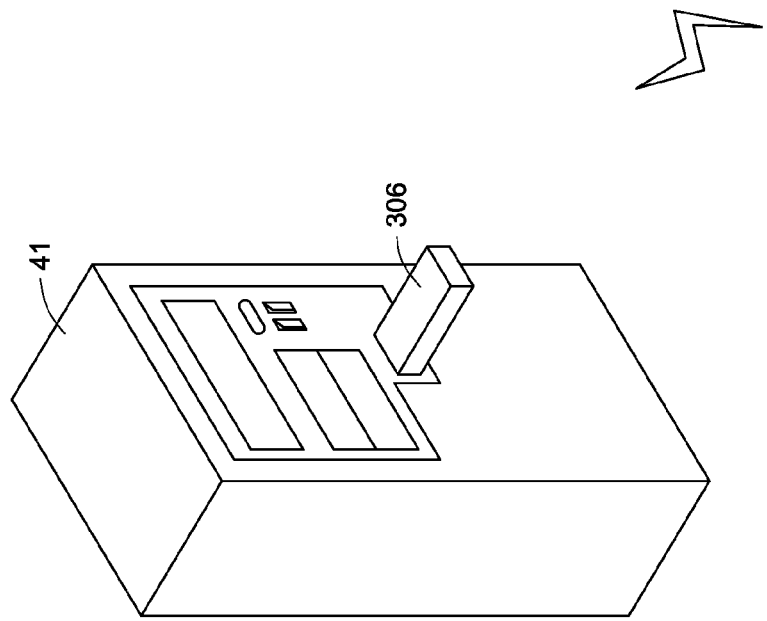
FIG. 2 is a schematic perspective view illustrating the outward appearance of a mouse device with a movable button according to a first embodiment of the present invention.
Figure 2:
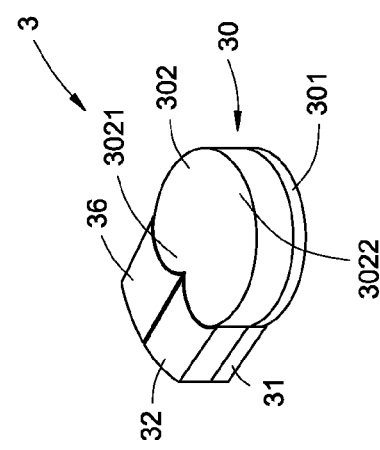

For obviating the drawbacks encountered from the prior art, the present invention provides a mouse device with a movable button. FIG. 2 is a schematic perspective view illustrating the outward appearance of a mouse device with a movable button according to a first embodiment of the present invention. As shown in FIG. 2, the mouse device 3 is in communication with a computer host 41. A wireless signal receiver 306 is connected with the computer host 41. The mouse device 3 comprises a mouse body 30, a first casing 31, a first button 32, a second casing 35 (see FIG. 3) and a second button 36. The mouse body 30 comprises a body base 301 and a body upper cover 302. The body upper cover 302 is disposed on the body base 301 and covers the body base 301. The body upper cover 302 has a body front end 3021 and a body rear end 3022. The first casing 31 is connected with the body front end 3021 of the mouse body 30. In addition, the first casing 31 is movable with respect to the mouse body 30 along the body front end 3021. The first button 32 is disposed on the first casing 31 and covers the first casing 31. The second casing 35 is connected with the body front end 3021 of the mouse body 30, and arranged beside the first casing 31. In addition, the second casing 35 is movable with respect to the mouse body 30 along the body front end 3021. The second button 36 is disposed on the second casing 35 for covering the second casing 35.

Figure 3:
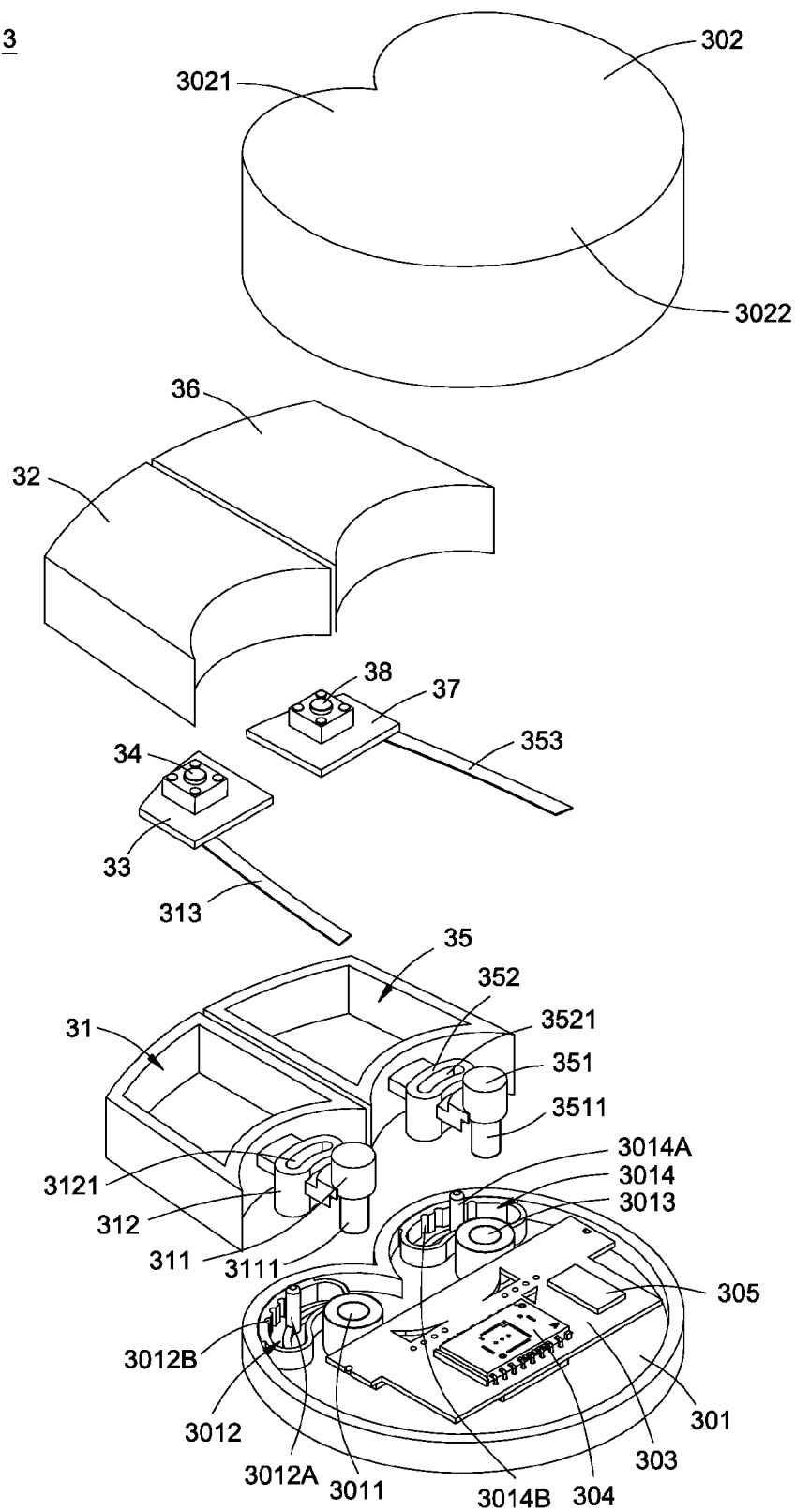
FIG. 3 is a schematic exploded view illustrating the mouse device with a movable button according to the first embodiment of the present invention.
Figure 4:
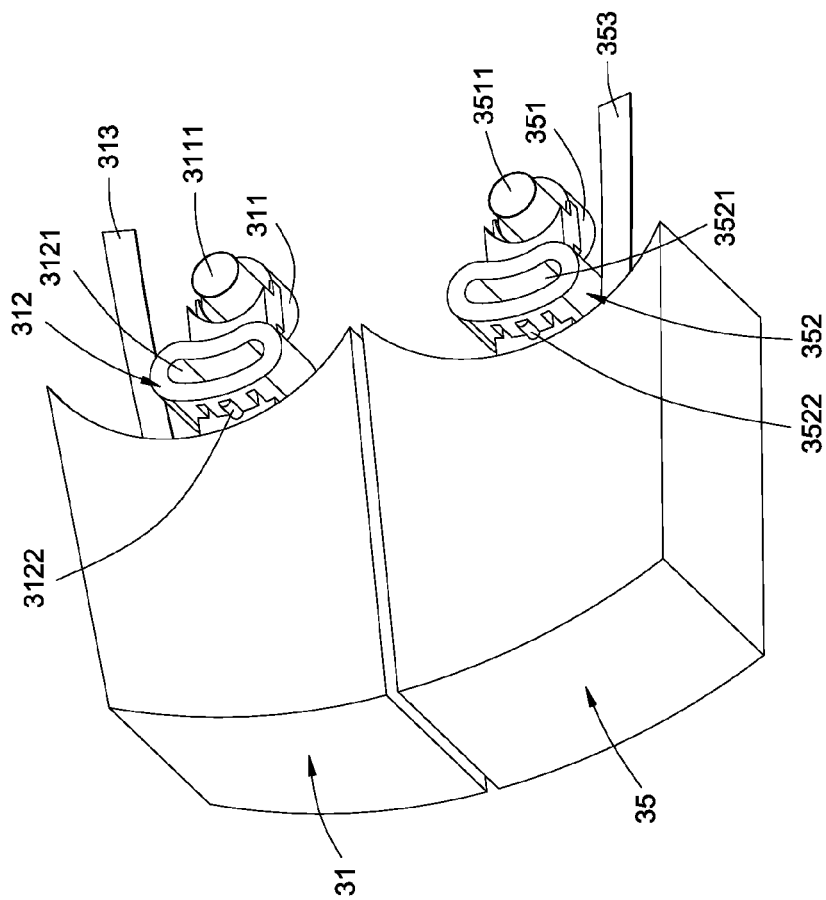
FIG. 4 is a schematic perspective view illustrating the first casing and the second casing of the mouse device with a movable button according to the first embodiment of the present invention, which is taken in another viewpoint.

Hereinafter, the internal structures of the mouse device 3 will be illustrated with reference to FIGS. 3 and 4. FIG. 3 is a schematic exploded view illustrating the mouse device with a movable button according to the first embodiment of the present invention. FIG. 4 is a schematic perspective view illustrating the first casing and the second casing of the mouse device with a movable button according to the first embodiment of the present invention, which is taken in another viewpoint. As shown in FIG. 3, the mouse device 3 further comprises a first circuit board 33, a first switch 34, a second circuit board 37 and a second switch 38. The mouse body 30 comprises a mouse body circuit board 303, an optical displacement sensing module 304 and a wireless signal transmitter 305. The displacement sensing module 304 and the wireless signal transmitter 305 are disposed on the mouse body circuit board 303. The displacement sensing module 304 is used for detecting the motion of the mouse body 30, thereby generating a cursor signal. The wireless signal transmitter 305 is used for emitting the cursor signal to the wireless signal receiver 306. As such, the cursor signal is transmitted to the computer host 41.

Please refer to FIGS. 3 and 4. The body base 301 comprises a first fixing hole 3011, a first sliding groove 3012, a second fixing hole 3013 and a second sliding groove 3014. The first sliding groove 3012 comprises a first fixing post 3012A and a first saw-toothed structure 3012B. The first casing 31 comprises a first rotating part 311, a first sliding part 312 and a first connecting wire 313. The first sliding part 312 is arranged between the first button 32 and the first rotating part 311. The first rotating part 311 is inserted within the mouse body 30 through the body front end 3021, and coupled with the first fixing hole 3011. Especially, the first rotating part 311 has a first protrusion 3111. The first protrusion 3111 is inserted into the first fixing hole 3011, so that the first casing 31 and the body base 301 are combined together. The first sliding part 312 has a first slot 3121 and a first salient 3122. The first slot 3121 is used for accommodating the first fixing post 3012A. The first salient 3122 is engaged with the first saw-toothed structure 3012B. In this embodiment, the first saw-toothed structure 3012B has four indentations.

The second sliding groove 3014 comprises a second fixing post 3014A and a second saw-toothed structure 3014B. The second casing 35 comprises a second rotating part 351, a second sliding part 352 and a second connecting wire 353. The second sliding part 352 is arranged between the second button 36 and the second rotating part 351. The second rotating part 351 is inserted within the mouse body 30 through the body front end 3021, and coupled with the second fixing hole 3013. Especially, the second rotating part 351 has a second protrusion 3511. The second protrusion 3511 is inserted into the second fixing hole 3013, so that the second casing 35 and the body base 301 are combined together. The second sliding part 352 has a second slot 3521 and a second salient 3522. The second slot 3521 is used for accommodating the second fixing post 3014A. The second salient 3522 is engaged with the second saw-toothed structure 3014B. In this embodiment, the second saw-toothed structure 3014B has four indentations.

Figure 5:
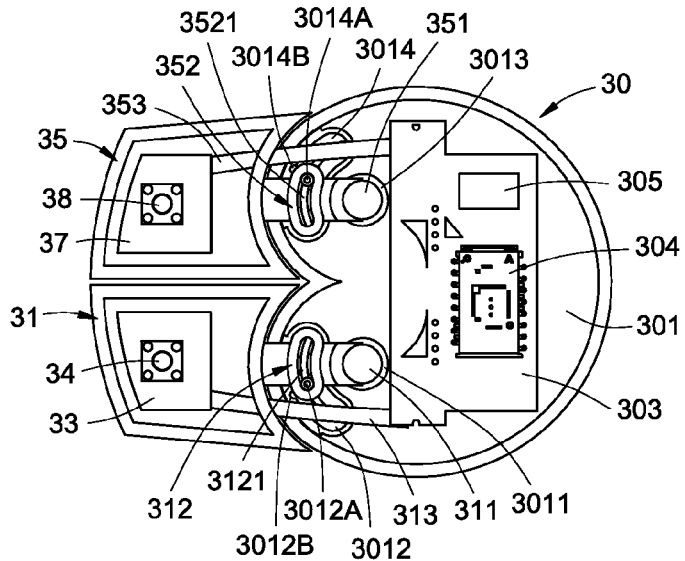
FIG. 5 is a schematic top view illustrating the internal components of the mouse device with a movable button according to the first embodiment of the present invention, in which the mouse device is in a first operating status.

The relationships between the internal components of the mouse device 3 will be illustrated with reference to FIG. 5. FIG. 5 is a schematic top view illustrating the internal components of the mouse device with a movable button according to the first embodiment of the present invention, in which the mouse device is in a first operating status. The first circuit board 33 is disposed within the first casing 31. The first switch 34 is mounted on the first circuit board 33 to be triggered by the first button 32. A first terminal of the first connecting wire 313 is connected to the first circuit board 33. A second terminal of the first connecting wire 313 is connected to the mouse body circuit board 303. The first rotating part 311 of the first casing 31 is inserted within the mouse body 30 through the body front end 3021, and the first protrusion 3111 of the first rotating part 311 is inserted into the first fixing hole 3011, so that the first casing 31 and the mouse body 30 are combined together. In addition, the first sliding part 312 is coupled with the first sliding groove 3012, the first salient 3122 is engaged with the first saw-toothed structure 3012B, and the first fixing post 3012A is inserted into the first slot 3121. As a consequence, the first sliding part 312 is fixed in the first sliding groove 3012 to avoid detachment of the first sliding part 312 from the first sliding groove 3012.

On the other hand, the second circuit board 37 is disposed within the second casing 35. The second switch 38 is mounted on the second circuit board 37 to be triggered by the second button 36. A first terminal of the second connecting wire 353 is connected to the second circuit board 37. A second terminal of the second connecting wire 353 is connected to the mouse body circuit board 303. The second rotating part 351 of the second casing 35 is inserted within the mouse body 30 through the body front end 3021, and the second protrusion 3511 of the second rotating part 351 is inserted into the second fixing hole 3013, so that the second casing 35 and the mouse body 30 are combined together. In addition, the second sliding part 352 is coupled with the second sliding groove 3014, the second salient 3522 is engaged with the second saw-toothed structure 3014B, and the second fixing post 3014A is inserted into the second slot 3521. As a consequence, the second sliding part 352 is fixed in the second sliding groove 3014 to avoid detachment of the second sliding part 352 from the second sliding groove 3014.

In a case that the mouse device 3 is in a first operating status, the first casing 31 and the second casing 35 are contacted with each other. Meanwhile, as shown in FIG. 5, the first sliding part 312 is arranged at the rightmost position of the first sliding groove 3012, and the first fixing post 3012A is arranged at the leftmost position of the first slot 3121. In addition, the second sliding part 352 is arranged at the leftmost position of the second sliding groove 3014, and the second fixing post 3014A is arranged at the rightmost position of the second slot 3521. Afterwards, the body base 301 is covered by the body upper cover 302.

Figure 6:
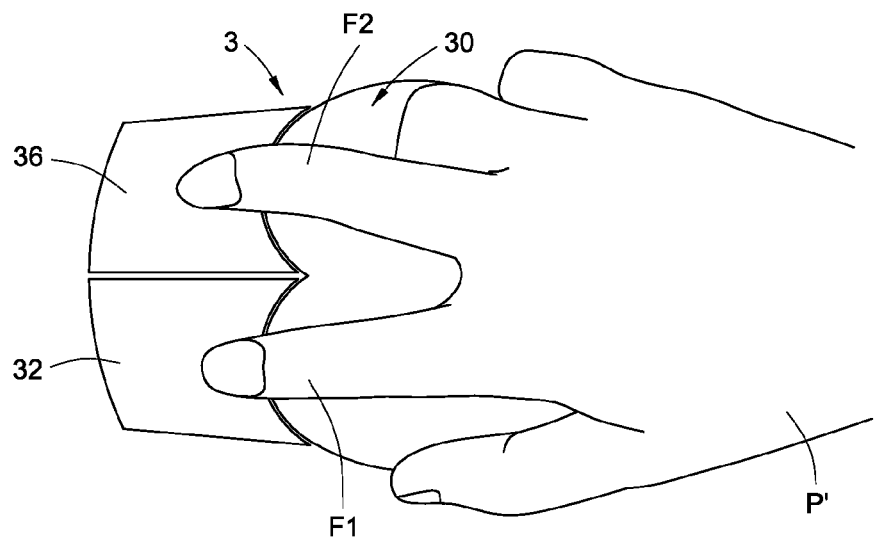
FIG. 6 is a schematic top view illustrating the outward appearance of the mouse device with a movable button according to the first embodiment of the present invention, in which the mouse device is in the first operating status.

FIG. 6 is a schematic top view illustrating the outward appearance of the mouse device with a movable button according to the first embodiment of the present invention, in which the mouse device is in the first operating status. The mouse device 3 in the first operating status is feasible to a female user. For operating the mouse device 3 by a female user, the palm P of the female user is placed on the body upper cover 302 of the mouse body 30 such that the palm P is supported by the mouse body 30, and a first finger F1 and a second finger F2 of the female user are respectively placed on the first casing 31 and the second casing 35. When the mouse body 30 is moved by the palm P, the optical displacement sensing module 304 issues a cursor signal in response to the motion of the mouse body 30. When the first button 32 is pressed by the first finger F1, the first switch 34 is triggered by the first button 32 to generate a first triggering signal. The first triggering signal will be transmitted from the first circuit board 33 to the mouse body circuit board 303 through the first connecting wire 313. Whereas, when the second button 36 is pressed by the second finger F2, the second switch 38 is triggered by the second button 36 to generate a second triggering signal. The second triggering signal will be transmitted from the second circuit board 37 to the mouse body circuit board 303 through the second connecting wire 353. The first triggering signal, the second triggering signal and the cursor signal are transmitted from the wireless signal transmitter 305 (see FIG. 5), which is mounted on the mouse body circuit board 303, to the wireless signal receiver 306 (see FIG. 2). As such, the first triggering signal, the second triggering signal and the cursor signal could be transmitted to the computer host 41.

However, the mouse device 3 in the first operating status is not feasible to a male user because the male user has a larger palm P', a longer first finger F1' and a longer second finger F2' when compared with the female user. When the palm P' of the male user is placed on the mouse body 30 and the first finger F1' and the second finger F2' are respectively placed on the first casing 31 and the second casing 35 to operate the mouse device 3 in the first operating status, the palm P' of the male user may be supported by the mouse body 30. However, the first finger F1' and the second finger F2' should be excessively bent to be respectively placed on the first casing 31 and the second casing 35 because the mouse device 3 in the first operating status is only feasible to the smaller palm P, the shorter first finger F1 and the shorter second finger F2. In other words, the use of the improper mouse device may incur hand fatigue of the male user.

Figure 7:
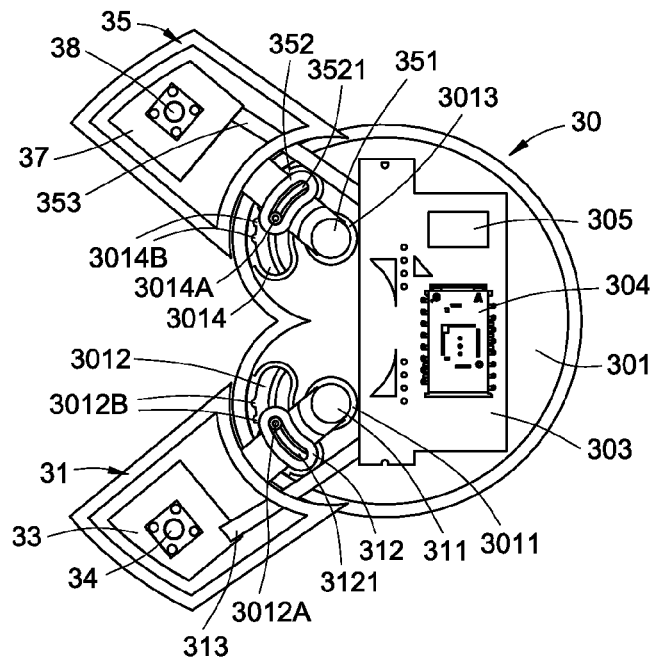
FIG. 7 is a schematic top view illustrating the internal components of the mouse device with a movable button according to the first embodiment of the present invention, in which the mouse device is in a second operating status.

For facilitating the male user to operate the mouse device 3, the male user may move the first casing 31 and the second casing 35. As such, the first rotating part 311 and the second rotating part 351 are respectively rotated with respect to the first fixing hole 3011 and the second fixing hole 3013, and the first sliding part 312 and the second sliding part 351 are respectively slid in the first sliding groove 3012 and the second sliding groove 3014. Since the first casing 31 and the second casing 35 are moved with respect to the mouse body 30 along the body front end 3021 of the mouse body 30, the mouse device 3 is switched from the first operating status to the second operating status (see FIG. 7). As shown in FIG. 7, the mouse device 3 is in a second operating status. Meanwhile, the first casing 31 and the second casing 35 are separated from each other. That is, the first sliding part 312 is arranged at the leftmost position of the first sliding groove 3012, the first fixing post 3012A is arranged at the rightmost position of the first slot 3121, the second sliding part 352 is arranged at the rightmost position of the second sliding groove 3014, and the second fixing post 3014A is arranged at the leftmost position of the second slot 3521. Since the first salient 3122 is moved from the rightmost indentation of the first saw-toothed structure 3012B to the leftmost indentation of the first saw-toothed structure 3012B, the first casing 31 is fixed at a specified position. In addition, since the second salient 3522 is moved from the leftmost indentation of the second saw-toothed structure 3014B to the rightmost indentation of the second saw-toothed structure 3014B, the second casing 35 is fixed at another specified position.

Figure 8:
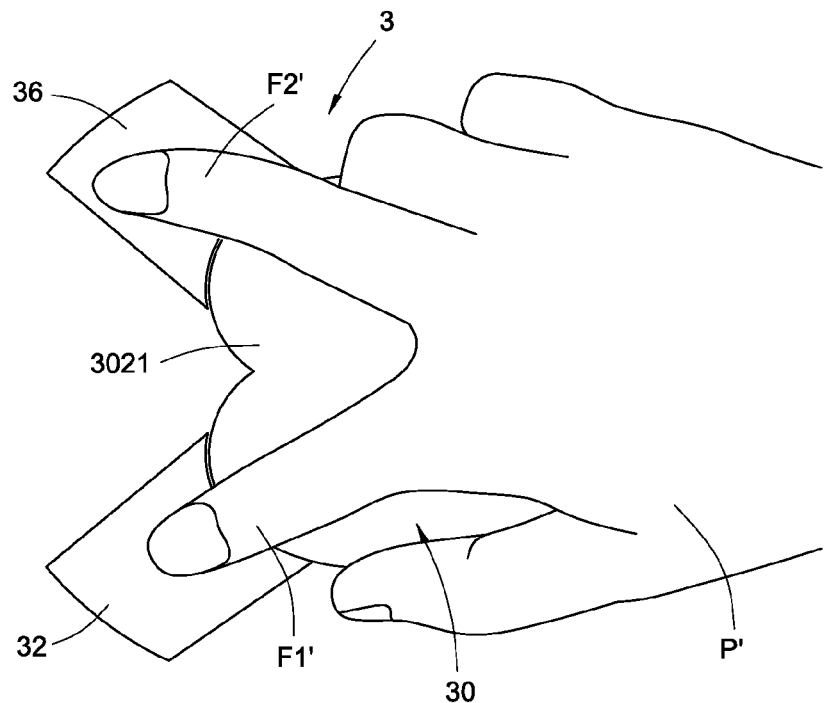
FIG. 8 is a schematic top view illustrating the outward appearance of the mouse device with a movable button according to the first embodiment of the present invention, in which the mouse device is in the second operating status.

FIG. 8 is a schematic top view illustrating the outward appearance of the mouse device with a movable button according to the first embodiment of the present invention, in which the mouse device is in the second operating status. When the mouse device 3 is in the second operating status, the first finger F1' and the second finger F2' of the male user may be slightly bent to be placed on the first casing 31 and the second casing 35. In addition, the palm P' could be supported on the mouse body 30, and the gesture of the palm P' is not altered in response to the movement of the first casing 31 and the second casing 35. In other words, the male user may feel more comfortable when the mouse device 3 is used.

From the above embodiments, the mouse device with a movable button according to the present invention may comply with different users of various-sized palms. Moreover, since each of the first saw-toothed structure 3012B and the second saw-toothed structure 3014B has four indentations, the first casing 31 and the second casing 35 could be respectively switched between four different positions of the body front end 3021. In other words, the outward profile of the mouse device may comply with different users of various-sized palms.

Figure 9:
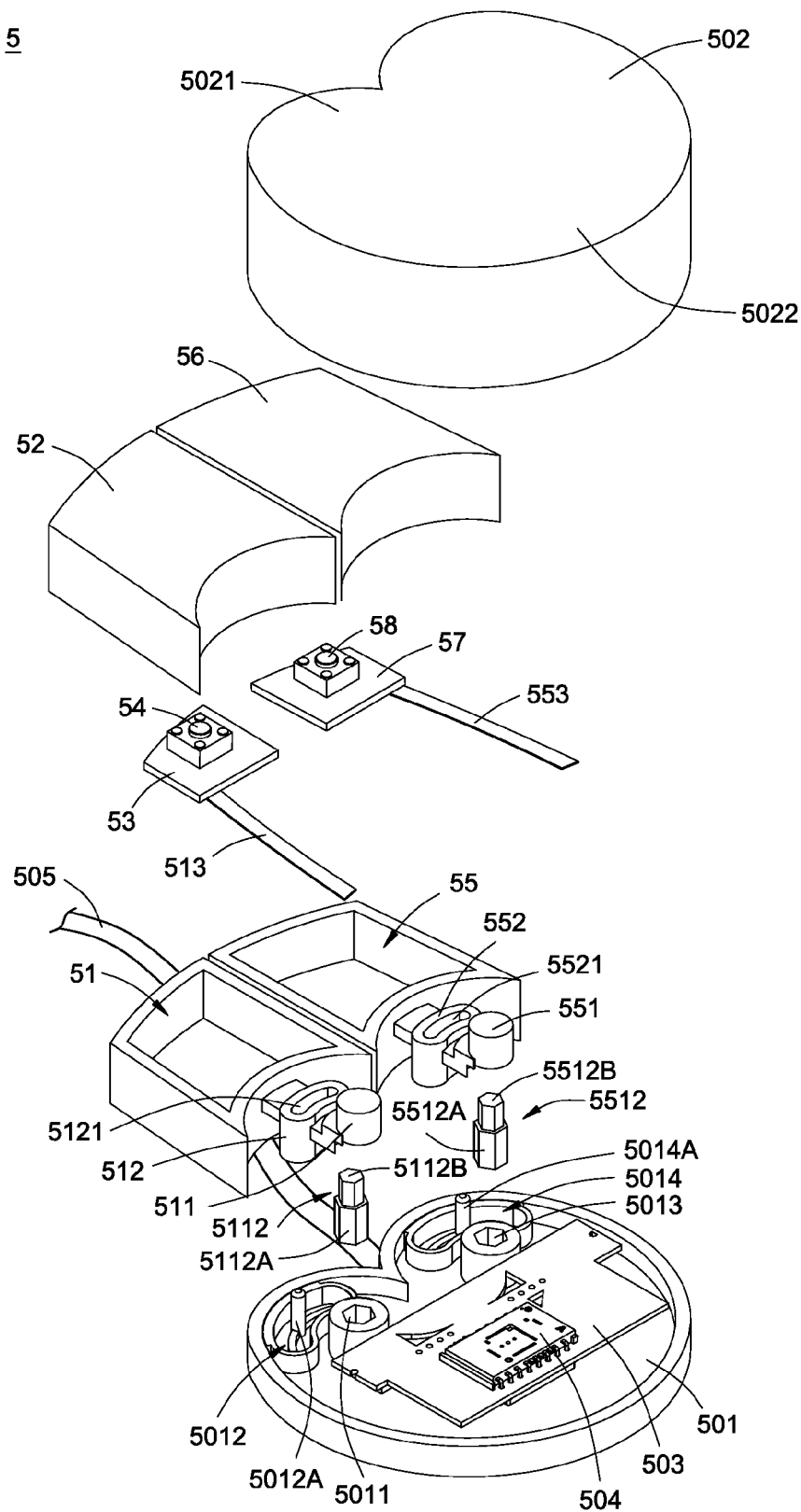
FIG. 9 is a schematic exploded view illustrating the mouse device with a movable button according to a second embodiment of the present invention.

The present invention further provides a second embodiment of the mouse device. FIG. 9 is a schematic exploded view illustrating the mouse device with a movable button according to a second embodiment of the present invention. As shown in FIG. 9, the mouse device 5 comprises a mouse body 50, a first casing 51, a first button 52, a first circuit board 53, a first switch 54, a second casing 55, a second button 56, a second circuit board 57 and a second switch 58. The mouse body 50 comprises a body base 501, a body upper cover 502, a mouse body circuit board 503, an optical displacement sensing module 504 and a mouse body connecting wire 505. The body upper cover 502 is disposed on the body base 501 and covers the body base 501. The body upper cover 502 has a body front end 5021 and a body rear end 5022. The displacement sensing module 504 is disposed on the mouse body circuit board 503. The displacement sensing module 504 is used for detecting the motion of the mouse body 50, thereby generating a cursor signal. The mouse body connecting wire 505 is connected to a computer host (not shown). Via the mouse body connecting wire 505, associated signals could be transmitted from the mouse device 3 to the computer host. The body base 501 comprises a first fixing hole 5011, a first sliding groove 5012, a second fixing hole 5013 and a second sliding groove 5014. In addition, the first sliding groove 5012 comprises a first fixing post 5012A, and the second sliding groove 5014 comprises a second fixing post 5014A.

Figure 10:
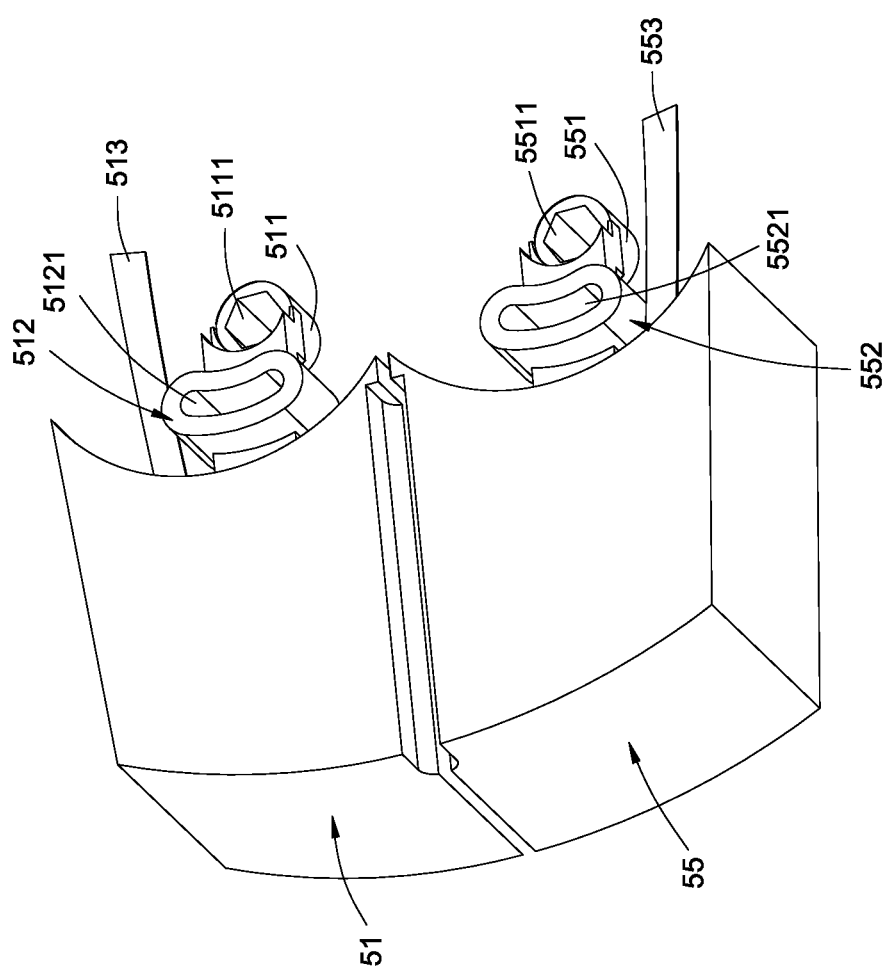
FIG. 10 is a schematic perspective view illustrating the first casing and the second casing of the mouse device with a movable button according to the second embodiment of the present invention, which is taken in another viewpoint.

FIG. 10 is a schematic perspective view illustrating the first casing and the second casing of the mouse device with a movable button according to the second embodiment of the present invention, which is taken in another viewpoint. Please refer to FIGS. 9 and 10. The first casing 51 comprises a first rotating part 511, a first sliding part 512 and a first connecting wire 513. The first sliding part 512 is arranged between the first button 52 and the first rotating part 511. The first rotating part 511 comprises a first coupling hole 5111 and a first rotating shaft 5112. The first sliding part 512 comprises a first slot 5121. The second casing 55 comprises a second rotating part 551, a second sliding part 552 and a second connecting wire 553. The second rotating part 551 comprises a second coupling hole 5511 and a second rotating shaft 5512. The second sliding part 552 comprises a second slot 5521.

Figure 11:
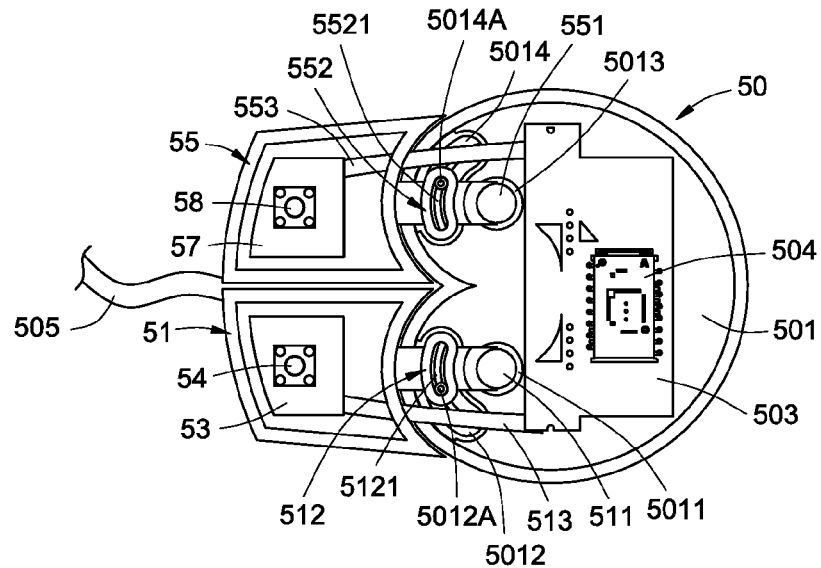
FIG. 11 is a schematic top view illustrating the internal components of the mouse device with a movable button according to the second embodiment of the present invention, in which the mouse device is in a first operating status.

Hereinafter, the internal structures of the mouse device 5 will be illustrated in more details with reference to FIG. 11. FIG. 11 is a schematic top view illustrating the internal components of the mouse device with a movable button according to the second embodiment of the present invention, in which the mouse device is in a first operating status. The first circuit board 53 is disposed within the first casing 51. The first switch 54 is mounted on the first circuit board 53 to be triggered by the first button 52. A first terminal of the first connecting wire 513 is connected to the first circuit board 53. A second terminal of the first connecting wire 513 is connected to the mouse body circuit board 503. The first rotating part 511 of the first casing 51 is inserted within the mouse body 50 through the body front end 5021. A first end 5112A of the first rotating shaft 5112 is inserted into the first fixing hole 5011, and a second end 5112B of the first rotating shaft 5112 is inserted into the first coupling hole 5111. The first end 5112A of the first rotating shaft 5112 and the first fixing hole 5011 are connected with each other to be synchronously rotated. The second end 5112B of the first rotating shaft 5112 and the first coupling hole 5111 are connected with each other to be synchronously rotated. In addition, the second end 5112B of the first rotating shaft 5112 is rotatable with respect to the first end 5112A. As such, the first casing 51 is movable with respect to body front end 5021 of the mouse body 50. When the first casing 51 and the mouse body 50 are combined together, the first sliding part 512 is coupled with the first sliding groove 5012, and the first fixing post 5012A is inserted into the first slot 5121. As a consequence, the first sliding part 512 is fixed in the first sliding groove 5012 to avoid detachment of the first sliding part 512 from the first sliding groove 5012.

On the other hand, the second circuit board 57 is disposed within the second casing 55. The second switch 58 is mounted on the second circuit board 57 to be triggered by the second button 56. A first terminal of the second connecting wire 553 is connected to the second circuit board 57. A second terminal of the second connecting wire 553 is connected to the mouse body circuit board 503. The second rotating part 551 of the second casing 55 is inserted within the mouse body 50 through the body front end 5021. A first end 5512A of the second rotating shaft 5512 is inserted into the second fixing hole 5013, and a second end 5512B of the second rotating shaft 5512 is inserted into the second coupling hole 5511. The first end 5512A of the second rotating shaft 5512 and the second fixing hole 5013 are connected with each other to be synchronously rotated. The second end 5512B of the second rotating shaft 5512 and the second coupling hole 5511 are connected with each other to be synchronously rotated. In addition, the second end 5512B of the second rotating shaft 5512 is rotatable with respect to the first end 5512A. As such, the second casing 51 is movable with respect to body front end 5021 of the mouse body 50. When the second casing 55 and the mouse body 50 are combined together, the second sliding part 552 is coupled with the second sliding groove 5014, and the second fixing post 5014A is inserted into the second slot 5521. As a consequence, the second sliding part 552 is fixed in the second sliding groove 5014 to avoid detachment of the first sliding part 552 from the second sliding groove 5014.

The mouse device 5 in the first operating status is feasible to a female user that has a smaller palm. In a case that the mouse device 5 is in the first operating status, the first casing 51 and the second casing 55 are contacted with each other. Meanwhile, the first sliding part 512 is arranged at the rightmost position of the first sliding groove 5012, and the first fixing post 5012A is arranged at the leftmost position of the first slot 5121. In addition, the second sliding part 552 is arranged at the leftmost position of the second sliding groove 5014, and the second fixing post 5014A is arranged at the rightmost position of the second slot 5521.

When the mouse device 5 is operated, a cursor signal is issued in response to the motion of the mouse body 50. When the first button 52 is pressed, the first switch 54 is triggered to generate a first triggering signal. When the second button 56 is pressed, the second switch 58 is triggered to generate a second triggering signal. The first triggering signal, the second triggering signal and the cursor signal are transmitted to the computer host through the mouse body connecting wire 505, so that the computer host executes a corresponding instruction.

Figure 12:
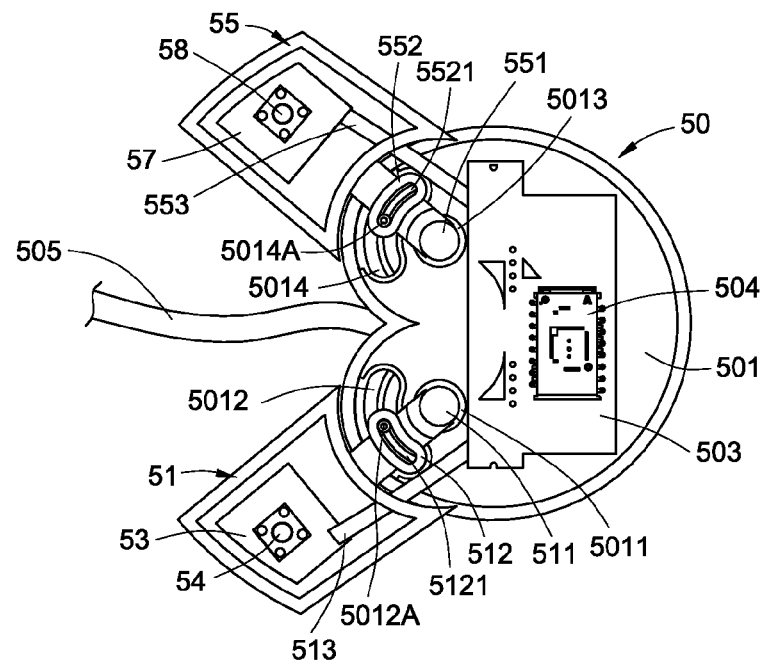
FIG. 12 is a schematic top view illustrating the internal components of the mouse device with a movable button according to the second embodiment of the present invention, in which the mouse device is in a second operating status.

For facilitating the male user that has a larger palm to operate the mouse device 5, the male user may move the first casing 51 and the second casing 55. As such, the first rotating part 511 and the second end 5112B of the first rotating shaft 5112 are rotated with respect to the first fixing hole 5011 and the first end 5112A of the first rotating shaft 5112, and the second rotating part 551 and the second end 5512B of the second rotating shaft 5512 are rotated with respect to the second fixing hole 5013 and the first end 5512A of the second rotating shaft 5512. In addition, the first sliding part 512 is slid in the first sliding groove 5012, and the second sliding part 552 is slid in the second sliding groove 5014. Since the first casing 51 and the second casing 55 are moved with respect to the mouse body 50 along the body front end 5021 of the mouse body 50, the mouse device 5 is switched from the first operating status to the second operating status (see FIG. 12).

By the way, in the first rotating shaft 5112, a viscous fluid (not shown) is filled in the region between the second end 5112B of the first rotating shaft 5112 and the first end 5112A of the first rotating shaft 5112 for providing a damping force between the first end 5112A and the second end 5112B. That is, for allowing rotation of the second end 5112B with respect to the first end 5112A, the external force exerted on the first rotating shaft 5112 should be large enough to overcome the damping force. That is, the first casing 51 is movable when the external force exerted on the first casing 51 is greater than the damping force. Whereas, when the first casing 51 is exerted by a force that is smaller than the damping force, the first rotating shaft 5112 fails to be rotated and the first casing 51 is maintained unchanged. In this situation, the positioning structure (e.g. the salient and the saw-toothed structure as described in the first embodiment) is no longer necessary. The operations of the second rotating shaft 5512 are similar to those of the first rotating shaft 5112, and are not redundantly described herein.

From the above two embodiments, it is understood that the mouse device with a movable button according to the present invention is feasible to different users of various-sized palms. In the above embodiments, the first casing and the second casing of the mouse device are movable with respect to the body front end of the mouse body, and the first casing and the second casing are separated from the body rear end. Under this circumstance, no matter how the positions of the first casing and the second casing are adjusted, the mouse device can maintain a proper profile to be operated by the user. As a consequence, the comfort of using the mouse device is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device with a movable button, said mouse device being in communication with a computer host, said mouse device comprising:
  a mouse body comprising
    a body base and a body upper cover, a first fixing hole, and a first sliding groove wherein said body base is covered by said body upper cover, and said body upper cover has a body front end and a body rear end;
a first casing connected with said body front end of said mouse body, and movable with respect to said mouse body along said body front end where said first casing further includes
a first rotating part inserted within said mouse body through said body front end, and coupled with said first fixing hole;
a first sliding part arranged between said first button and said first rotating part, inserted within said mouse body through said body front end, and coupled with said first sliding groove, wherein said first rotating part is rotatable with respect to said first fixing hole, so that said first casing is movable with respect to said mouse body;
a first button disposed on said first casing and covering said first casing;
a first circuit board disposed within said first casing; and
a first switch mounted on said first circuit board to be triggered by said first button, wherein said first casing is separated from said body rear end of said mouse body.

2. The mouse device with a movable button according to claim 1 wherein said first rotating part has a first protrusion inserted into said first fixing hole, so that said first casing and said mouse body are combined together, wherein said first protrusion is rotatable with respect to said first fixing hole, so that said first casing is movable with respect to said mouse body.

3. The mouse device with a movable button according to claim 2 wherein said first sliding groove further comprises a first saw-toothed structure, and said first sliding part further comprises a first salient, wherein when said first casing is moved with respect to said mouse body, said first sliding part is moved in said first sliding groove, and said first salient is engaged with said first saw-toothed structure to fix said first casing.

4. The mouse device with a movable button according to claim 1 wherein said first rotating part comprises a first coupling hole and a first rotating shaft, wherein a first end of said first rotating shaft is inserted into said first fixing hole, and a second end of said first rotating shaft is inserted into said first coupling hole, wherein said first end of said first rotating shaft and said first fixing hole are connected with each other to be synchronously rotated, said second end of said first rotating shaft and said first coupling hole are connected with each other to be synchronously rotated, and said second end of said first rotating shaft is rotatable with respect said first end of said first rotating shaft, so that said first casing is movable with respect to said mouse body.

5. The mouse device with a movable button according to claim 1 wherein said first sliding part comprises a first slot, and said first sliding groove comprises a first fixing post, wherein when said first casing is moved with respect to said mouse body and said first sliding part is moved in said first sliding groove, said first fixing post is inserted into said first slot, so that said first sliding part is fixed in said first sliding groove.

6. The mouse device with a movable button according to claim 1 wherein said mouse device further comprises:
a second casing connected with said body front end of said mouse body, arranged beside said first casing, and movable with respect to said mouse body along said body front end;
a second button disposed on said second casing and covering said second casing;
a second circuit board disposed within said second casing; and
a second switch mounted on said second circuit board to be triggered by said second button,
wherein said second casing is separated from said body rear end of said mouse body.

7. The mouse device with a movable button according to claim 6 wherein said mouse body further comprises a second fixing hole and a second sliding groove, and said second casing comprises:
a second rotating part inserted within said mouse body through said body front end, and coupled with said second fixing hole; and
a second sliding part arranged between said second button and said second rotating part, inserted within said mouse body through said body front end, and coupled with said second sliding groove, wherein said second rotating part is rotatable with respect to said second fixing hole, so that said second casing is movable with respect to said mouse body.

8. The mouse device with a movable button according to claim 7 wherein said second rotating part has a second protrusion inserted into said second fixing hole, so that said second casing and said mouse body are combined together, wherein said second protrusion is rotatable with respect to said second fixing hole, so that said second casing is movable with respect to said mouse body.

9. The mouse device with a movable button according to claim 8 wherein said second sliding groove further comprises a second saw-toothed structure, and said second sliding part further comprises a second salient, wherein when said second casing is moved with respect to said mouse body, said second sliding part is moved in said second sliding groove, and said second salient is engaged with said second saw-toothed structure to fix said second casing.

10. The mouse device with a movable button according to claim 6 wherein said second rotating part comprises a second coupling hole and a second rotating shaft, wherein a first end of said second rotating shaft is inserted into said second fixing hole, and a second end of said second rotating shaft is inserted into said second coupling hole, wherein said first end of said second rotating shaft and said second fixing hole are connected with each other to be synchronously rotated, said second end of said second rotating shaft and said second coupling hole are connected with each other to be synchronously rotated, and said second end of said second rotating shaft is rotatable with respect said first end of said second rotating shaft, so that said second casing is movable with respect to said mouse body.

11. The mouse device with a movable button according to claim 7 wherein said second sliding part comprises a second slot, and said second sliding groove comprises a second fixing post, wherein when said second casing is moved with respect to said mouse body and said second sliding part is moved in said second sliding groove, said second fixing post is inserted into said second slot, so that said second sliding part is fixed in said second sliding groove.

12. The mouse device with a movable button according to claim 6 wherein said mouse body further comprises a mouse body circuit board and an optical displacement sensing module, and said optical displacement sensing module is mounted on said mouse body circuit board for detecting a motion of said mouse body, thereby generating a cursor signal, wherein said first casing further comprises a first connecting wire, a first terminal of said first connecting wire is connected to said first circuit board, a second terminal of said first connecting wire is connected to said mouse body circuit board, said first switch generates a first triggering signal when said first button is pressed to trigger said first switch, and said first triggering signal is transmitted to said mouse body circuit board through said first connecting wire, wherein said second casing further comprises a second connecting wire, a first terminal of said second connecting wire is connected to said second circuit board, a second terminal of said second connecting wire is connected to said mouse body circuit board, said second switch generates a second triggering signal when said second button is pressed to trigger said second switch, and said second triggering signal is transmitted to said mouse body circuit board through said second connecting wire.

13. The mouse device with a movable button according to claim 12 wherein said mouse body further comprises a mouse body connecting wire, which is arranged between said first casing and said second casing, wherein said mouse body connecting wire is connected to a computer host, so that said first triggering signal, said second triggering signal and said cursor signal are transmitted to said computer host through said mouse body connecting wire.

14. The mouse device with a movable button according to claim 12 wherein said mouse body further comprises a wireless signal transmitter for outputting said first triggering signal, said second triggering signal and said cursor signal, wherein a wireless signal receiver is connected to said computer host for receiving said first triggering signal, said second triggering signal and said cursor signal.

* * * * *